(12) United States Patent
Weers et al.

(10) Patent No.: US 8,641,484 B1
(45) Date of Patent: Feb. 4, 2014

(54) VARIABLE SPEED LINKER

(71) Applicant: Marel Meat Processing, Inc., Des Moines, IA (US)

(72) Inventors: Timothy V. Weers, Urbandale, IA (US); David Nida, Des Moines, IA (US); David W. Alexander, Boone, IA (US); Kenneth B. Arnote, Jr., Albion, IA (US)

(73) Assignee: Marel Meat Processing Inc., Des Moines, IA (US)

( * ) Notice: Subject to any disclaimer, the term of this patent is extended or adjusted under 35 U.S.C. 154(b) by 0 days.

(21) Appl. No.: 13/768,131

(22) Filed: Feb. 15, 2013

(51) Int. Cl.
*A22C 11/00* (2006.01)

(52) U.S. Cl.
USPC .......................................................... 452/46

(58) Field of Classification Search
USPC ...................... 452/46–48, 51, 30–32, 35–37
See application file for complete search history.

(56) References Cited

U.S. PATENT DOCUMENTS

| | | | |
|---|---|---|---|
| 3,873,744 A | | 3/1975 | Townsend et al. |
| 3,971,101 A | * | 7/1976 | Townsend et al. .............. 452/48 |
| 4,905,349 A | * | 3/1990 | Townsend ........................ 452/32 |
| 6,439,990 B1 | * | 8/2002 | Kasai et al. ..................... 452/46 |
| 6,482,079 B1 | * | 11/2002 | Nakamura et al. .............. 452/47 |
| 6,688,959 B2 | * | 2/2004 | Kasai et al. ..................... 452/30 |
| 7,704,131 B1 | * | 4/2010 | Malenke et al. ................ 452/46 |
| 8,231,441 B2 | * | 7/2012 | Nakamura et al. .............. 452/33 |

* cited by examiner

*Primary Examiner* — Richard Price, Jr.
(74) *Attorney, Agent, or Firm* — Zarley Law Firm, P.L.C.

(57) ABSTRACT

A variable speed linking device wherein the rotational speed of the chains is reduced approximately when the outer edge of the pinchers first engage a casing.

7 Claims, 3 Drawing Sheets

VARIABLE SPEED LINKER

BACKGROUND OF THE INVENTION

This invention is directed to a linker for processing food products, and more particularly a linker having a variable rotational speed.

Linker devices are well-known in the art. With conventional linkers, as the pinchers rotate about the input end, the outer edge of the pincher rotates at a speed greater than the speed of the base and chain. Because the outer edge engages a casing at an increased speed, the outer edge pulls the casing forward at a speed greater than the base which results in air pockets forming within a filled casing and fracture of the food product. Thus, a device that addresses this deficiency is needed in the art.

A principal objective of the present invention is to provide a linking device that has a variable speed.

A further objective of the present invention is to provide a linking device that engages a casing at a generally constant speed.

These and other objectives will be apparent to one of ordinary skill in the art based upon the following written description, drawings an claims.

SUMMARY OF THE INVENTION

A linker device having a pair of continuous chains or belts positioned in spaced relation. The chains are mounted to sprockets driven by a servo motor controlled by a computer. Attached to the chains are a plurality of pinchers that are positioned such that the pinchers on one chain align with and intersect with the pinchers on the other chain without making contact.

The chains rotate at a transport speed until approximately when the outer edges of aligned pinchers first engage a casing placed over the discharge end of a stuffing tube. The rotational speed of the chains returns to the transport speed approximately when the aligned pinchers intersect to squeeze and compress a filled casing.

DETAILED DESCRIPTION OF THE PREFERRED EMBODIMENTS

Figure 1:
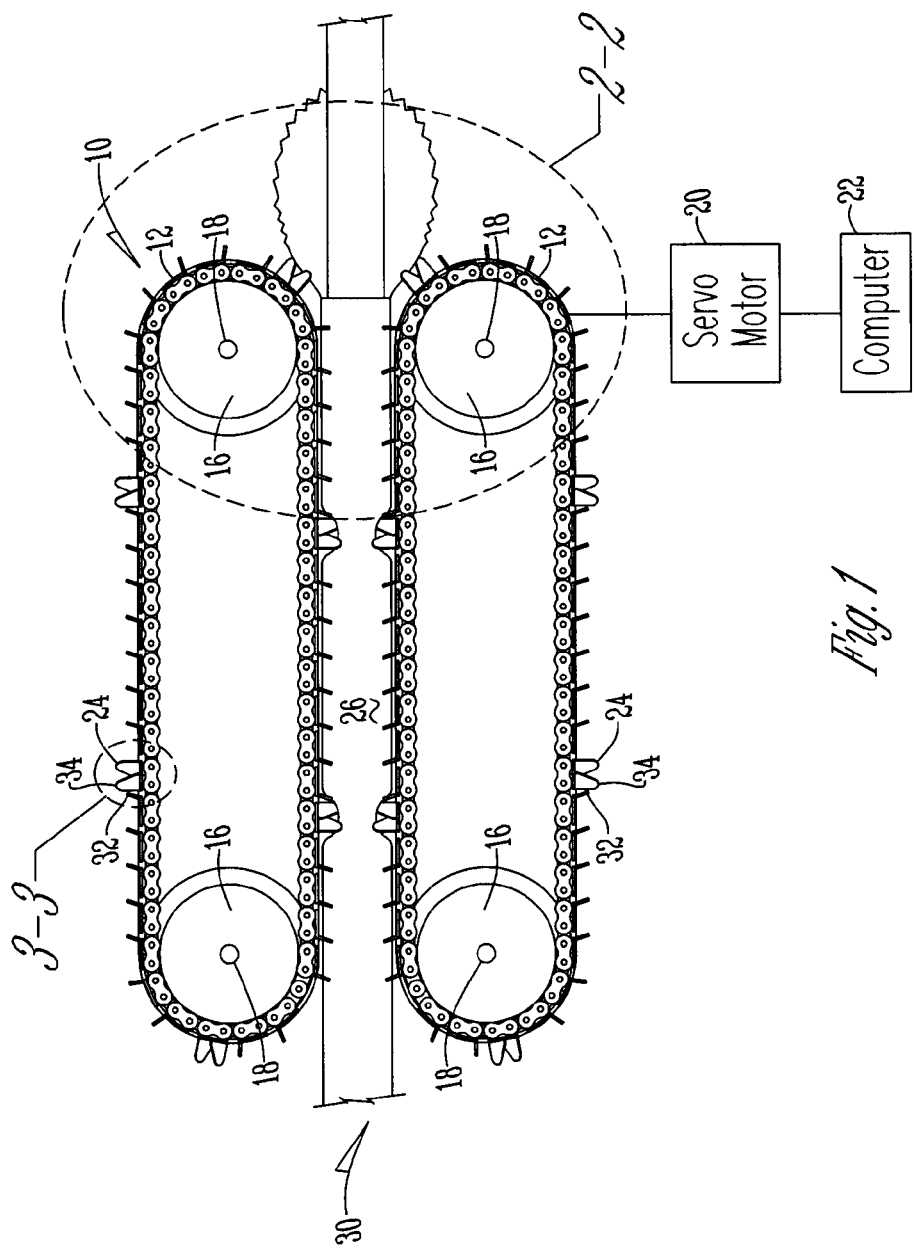
FIG. 1 is a side view of a linking device.
Figure 2:
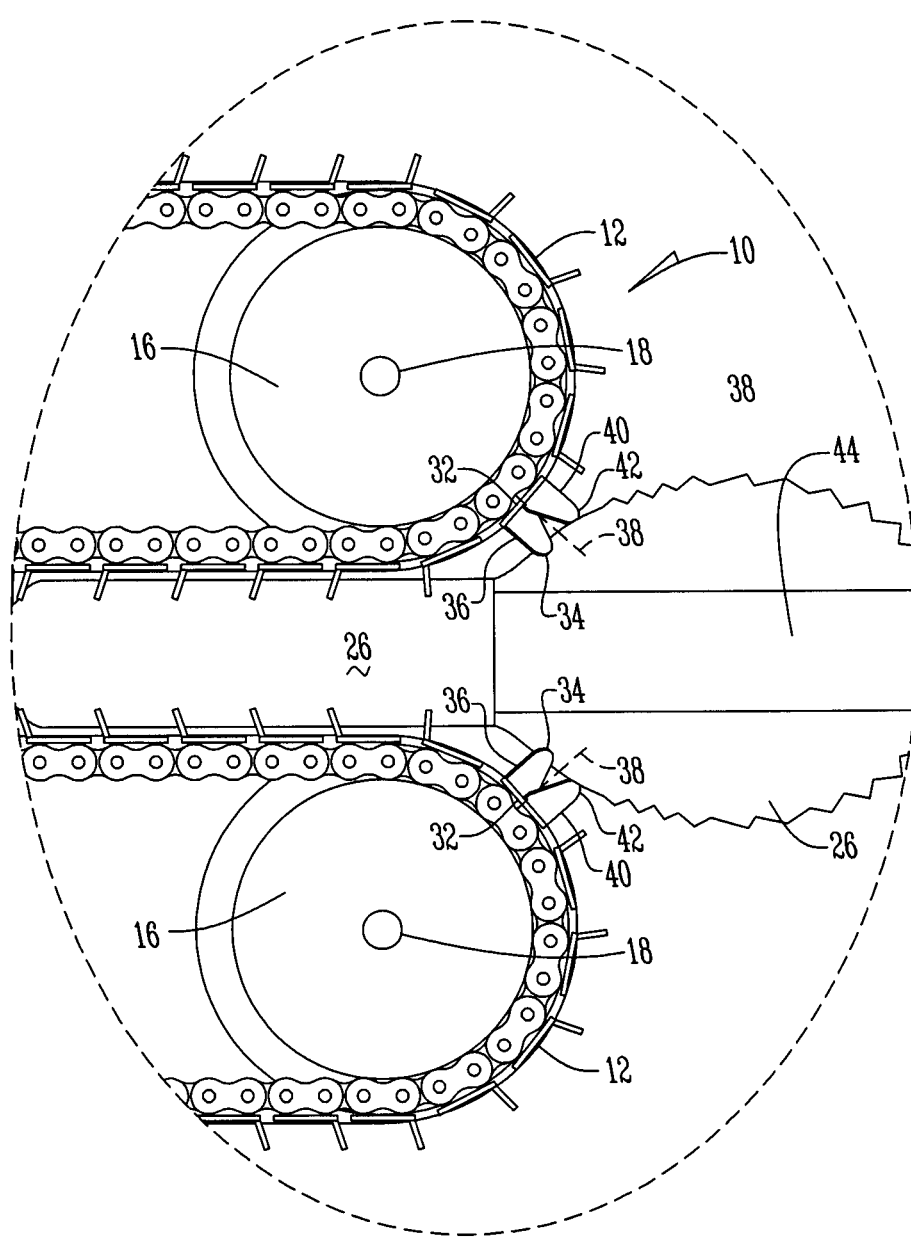
FIG. 2 is a partial side view of a linking device.
Figure 3:
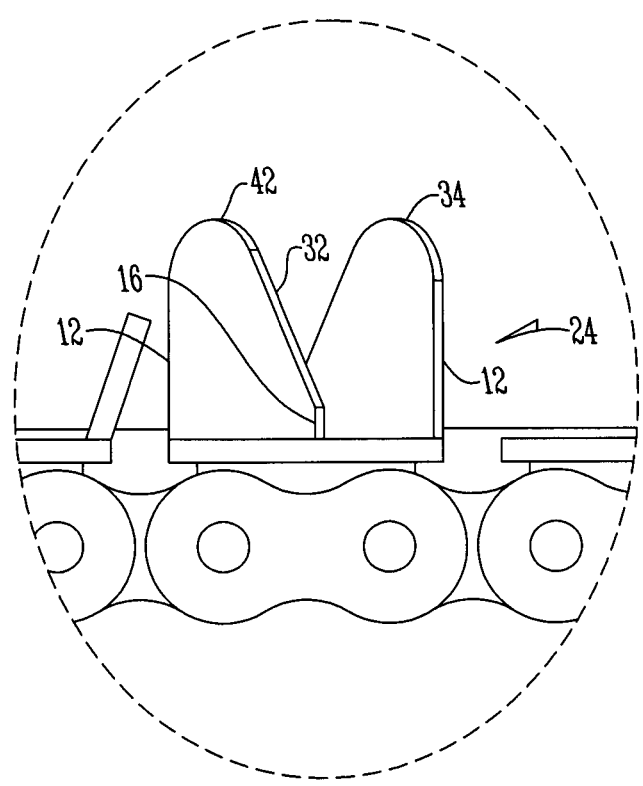
FIG. 3 is a partial end view of a linking device.

Referring to the Figures, the linker 10 has a pair of chains or belts 12, 14 mounted on a plurality of sprockets or pulleys 16. The sprockets 16 are mounted on rotating shafts 18 which are driven by a servo motor 20 controlled by a computer, PLC, controller 22 or the like.

Mounted to the chains 12 and 14 are a plurality of pinchers 24. The pinchers are positioned on the chains 12 and 14 such that upon rotation of the chains 12 and 14, the pinchers 24 align to squeeze and constrict a casing 26 filled with meat emulsion at the load end 28 of the linker 10. The pinchers 24 remain aligned as the filled casings are transported through the linker 10 and between the chains 12 and 14 to the discharge end 30.

The pinchers 24 have a base 32 that is connected to the chains 12 and 14 and extend outwardly to an outer edge 34. As the pinchers 24 extend outwardly they are angled such that a first side edge 36 dwells to the left of the plane 38 extending outwardly from the base 32 and the second side edge 40 dwells to the right of the plane 30. The outer edge 34 has a generally centrally located recess 42. The angle of the pinchers 24 on chain 12 are opposite the angle of pinchers 24 on chain 14 and are spaced from one another such that they intersect at the recess 42 without making contact.

In operation the controller 22 sends a signal to the servo motor 20 which controls the rotation of drive shaft 18. The drive shafts 18 rotate drive sprockets 16 which in turn rotate chains 12 and 14. The rotational speed of the chains 12 and 14 is based upon desired pieces of food product per minute.

As the pinchers 24 rotate about the load end 28 of the linker 10, approximately at the position where the outer edges 34 of aligned pinchers 24 first engages a casing 26 as it is being filled on a stuffing tube 44, the controller 22 sends a signal to the servo motor 20 which slows the rotational speed of chains 12 and 14. Preferably, the rotational speed of the chains 12 and 14 such that the rotational speed of the outer edges 34, which have accelerated as they rotate about the load end 28 of the pincher, are decreased to approximately the beginning or transport speed of the chains. To achieve the decrease, the chains 12 and 14 may be stopped or reversed for a micro-second. As the pinchers 24 approach and/or intersect to squeeze and constrict the filled casing 26, the controller 22 sends a signal to the servo motor 20 to return the rotational speed of the chains 12 and 14 to their beginning or transport speed. In this manner, while the speed of the chains 12 and 14 is briefly decreased, the casing 26 experiences little if any change in speed which reduces the chance of the filled casing having air pockets and fracturing.

Thus, a linking device has been disclosed that, at the very least meets all the stated objectives.

What is claimed is:

1. A linking device for processing a food product, comprising:
   a pair of chains in spaced alignment mounted to sprockets and driven by a servo motor;
   a plurality of pinchers connected to the chains and having a base and an outer edge;
   wherein the chains have a transport speed and the transport speed is reduced approximately when the pinchers engage a casing.

2. The device of claim 1 wherein the reduced speed of the chains is returned to the transport speed approximately when the pinchers intersect to squeeze and compress a casing filled with food product.

3. The device of claim 1 wherein the reduced speed of the chain causes the outer edge of the pincher to rotate at approximately the same speed as the transport speed.

4. The device of claim 3 wherein the reduced speed of the chains is caused by stopping the chain for a micro-second.

5. The method of claim 4 wherein the reduced rotational speed of the chains causes the outer edge of the pinchers to rotate at a speed approximately equal to the transport speed.

6. The device of claim 3 wherein the reduced speed is caused by reversing the chains for a micro-second.

7. A method of operating a linking device for processing a food product, comprising the steps of:
   rotating a pair of chains in spaced parallel alignment and having a plurality of pinchers at a transport rotational speed;
   reducing the rotational speed of the chains approximately when an outer edge of the pinchers engage a casing; and returning the rotational speed of the chains to the transport speed approximately when aligned pinchers intersect to squeeze and compress a casing filled with food product.

* * * * *